United States Patent [19]

Sasagawa et al.

[11] Patent Number: 5,126,425
[45] Date of Patent: Jun. 30, 1992

[54] LOW-HYGROSCOPIC SULFUR-CONTAINING URETHANE RESIN, COATING MATERIAL AND ADHESIVE

[75] Inventors: Katsuyoshi Sasagawa; Yoshinobu Kanemura; Masao Imai, all of Yokohama, Japan

[73] Assignee: Mitsui Toatsu Chemicals, Inc., Tokyo, Japan

[21] Appl. No.: 483,768

[22] Filed: Feb. 23, 1990

Related U.S. Application Data

[63] Continuation of Ser. No. 208,048, Jun. 17, 1988, abandoned.

[30] Foreign Application Priority Data

| Apr. 1, 1987 | [JP] | Japan | 62-77623 |
| Jun. 19, 1987 | [JP] | Japan | 62-151477 |
| Jul. 3, 1987 | [JP] | Japan | 62-165209 |

[51] Int. Cl.$^5$ .............. C08G 18/38; C08G 18/52; C08G 18/87
[52] U.S. Cl. .................. 528/58; 528/67; 528/85; 528/374
[58] Field of Search ................ 528/58, 85, 374, 67

[56] References Cited

U.S. PATENT DOCUMENTS

| 3,114,734 | 12/1963 | Gobran et al. | 528/52 |
| 3,124,544 | 3/1964 | Proops | 521/117 |
| 3,591,560 | 7/1971 | Wagner et al. | 528/81 |
| 3,640,965 | 2/1972 | Brode et al. | 528/74 |
| 3,681,272 | 8/1972 | Gloskey | 521/115 |
| 4,525,570 | 6/1985 | Blum et al. | 528/75 |
| 4,680,369 | 7/1987 | Kajimoto et al. | 528/76 |
| 4,689,387 | 8/1987 | Kajimoto et al. | 528/76 |
| 4,775,733 | 10/1988 | Kanemura et al. | 528/67 |
| 4,945,127 | 7/1990 | Kagawa et al. | 524/524 |
| 4,950,258 | 8/1990 | Kawai et al. | 264/230 |
| 5,049,591 | 9/1991 | Hayashi et al. | 528/59 |
| 5,057,252 | 10/1991 | Kagawa et al. | 521/134 |

FOREIGN PATENT DOCUMENTS

| 268896 | 6/1988 | European Pat. Off. |
| 271839 | 6/1988 | European Pat. Off. |
| 60-199016 | 10/1985 | Japan |

OTHER PUBLICATIONS

Saunders et al, "Polyurethane", p. 617.

*Primary Examiner*—John Kight, III
*Assistant Examiner*—Rabon Sergent
*Attorney, Agent, or Firm*—Burns, Doane, Swecker & Mathis

[57] ABSTRACT

There are here provided a low-hygroscopic sulfur-containing and crosslinked structure-having urethane resin, urethane resin plate and shape-recoverable molding article which is prepared by first selecting a polyisocyanate compound having m (which is an integer of 2 or more) isocyanate groups in one molecule and a polythiol compound having n (which is an integer of 2 or more) thiol groups in one molecule so that the total number of m+n may be 5 or more, and then polymerizing the composition of the polyisocyanate compound and the polythiol compound; a low-hygroscopic sulfur-containing urethane coating material which comprises the above composition; and a low-hygroscopic sulfur-containing urethane adhesive which comprises the composition. In the resin of the present invention, its water absorption is as low as a level of 0.02 to 0.20% by weight, and its adhesion to a hard coating film is also good. The coating material and the adhesive of the present invention have a long pot life, a low water absorption and a high adhesive force even after dipping in warm water.

7 Claims, No Drawings

LOW-HYGROSCOPIC SULFUR-CONTAINING URETHANE RESIN, COATING MATERIAL AND ADHESIVE

This application is a continuation of application Ser. No. 208,048, filed Jun. 17, 1988, now abandoned.

BACKGROUND OF THE INVENTION (1) Field of the Invention

The present invention relates to a low-hygroscopic thermosetting sulfur-containing resin and resin plate, a shape-recoverable molded article, sulfur-containing coating material for forming low-hygroscopic coating film, and a sulfur-containing urethane adhesive having a long pot life and high water resistance.

(2) Description of the Prior Art

Urethane resins have excellent elasticity as well as high wear resistance, tensile strength and tear resistance, and are resistant to oxygen and ozone. In recent years, therefore, these resins have been widely used in the form of elastomers as materials for bumpers and mechanical parts.

Furthermore, the urethane resins are substantially transparent but are more hygroscopic than polymethacrylate resins and polycarbonate resins. Therefore, they are liable to warp and crack, and for this reason, they cannot be subjected to a hard coating agent treatment which is essential for the manufacture of windowpanes for vehicles, covers for lighting units, signboards, photodiscs, photocards and the like. Consequently, the urethane resins are not applied to these uses at present.

In addition, urethane coating materials have a beautiful appearance as well as high adhesion and wear resistance, and they are resistant to oxygen and ozone. For this reason, the urethane coating materials are utilized for high-quality woodwork as well as an outer decoration for buildings, airplanes and railway cars. Recently, it has been attempted to use them for coating automobiles.

The urethane coating materials also exhibit rapid curing and high luster, but their pot life is short and the hygroscopicity of a coating film made therefrom is greater than polyacrylate coating materials. Thus, urethane coating materials having low hygroscopicity in addition to weathering resistance are desired.

Urethane adhesives are used as various reactive-type adhesives. That is, the urethane adhesive contains a compound having an isocyanate group, which is active as to react with, e.g., a hydroxyl group contained or adsorbed in most substances, with the result that a very strong adhesive force is exerted. In addition, the urethane adhesives are generally excellent in chemical resistance, cold resistance and impact resistance, and therefore they are now used as adhesives for structures which require semipermanent bonding force and high-strength holding force.

As the urethane adhesives, the so-called two-part adhesives are widely utilized in which a three-dimensional cross-linked urethane is formed by the reaction of a polyisocyanate, a polyester polyol and then cured and a polyether polyol, obtain strong adhesive force. Heretofore, in order to improve the water resistance of bonding layers, a method using a specific kind of polyol and another method in which an epoxy resin having relatively good water resistance is simutaneously used have been proposed (Japanese Patent Publication No. 41-22758).

Since the urethane adhesives have high reactivity, their pot life in a liquid state is short and their workability is poor. Furthermore, the urethane resins have higher water absorption as compared with any other resin and a urethane linkage is substantially liable to hydrolyze, and therefore there is the problem that the urethane linkage in the bonding layers can be cleaved.

In a urethane resin bonding layer prepared by the above-mentioned conventional method in which water resistance is improved, 1.0 to 2.0% by weight of water is contained, even in the case of an example where the water absorption is lowest. In summary, the urethane adhesives still have the drawback that their adhesive force deteriorates when exposed to the repetition of dry and wet periods and when wetted directly with rainwater.

SUMMARY OF THE INVENTION

The present invention intends to solve the problem that urethane resins have high hygroscopicity and the other drawback that their pot life is short when they are used as coating materials and adhesives.

An object of the present invention is to provide a low-hygroscopic sulfur-containing urethane resin which is prepared by first selecting a polyisocyanate compound having m (which is an integer of 2 or more) isocyanate groups in one molecule and a polythiol compound having n (which is an integer of 2 or more) thiol groups in one molecule so that the total number of $m+n$ may be 5 or more, and then polymerizing the composition containing the polyisocyanate compound and the polythiol compound.

Another object of the present invention is to provide a low-hygroscopic sulfur-containing urethane resin plate and shape-recoverable molded articles prepared by casting the above-mentioned composition.

Still another object of the present invention is to provide a low-hygroscopic sulfur-containing urethane coating material which comprises the above-mentioned composition.

A further object of the present invention is to provide a low-hygroscopic sulfur-containing urethane adhesive which comprises the above-mentioned composition.

DETAILED DESCRIPTION OF THE INVENTION

A first aspect of the present invention is directed to a polyurethane resin which can maintain transparency and which has low hygroscopicity.

A second aspect of the present invention is directed to a shape-recoverable sulfur-containing urethane resin molded article prepared by cast-polymerizing in a mold so as to cause said article to have a shape memory.

A third aspect of the present invention is directed to a polyurethane coating material which has a long pot life and which can form a low-hygroscopic urethane coating film.

A fourth aspect of the present invention is directed to a urethane adhesive which has a long pot life in the liquid state and which is excellent in water resistance in the case that the adhesive is used as an adhesive layer.

The inventors of the present application have intensively investigated with the intention of accomplishing the above-mentioned objects.

Heretofore, in order to improve the hygroscopicity of the urethane resin, much attention has been paid to the structure of a polyol which is a raw material. However, even in commercially available thermoplastic polyurethane elastomers having the lowest hygroscopicity, the moisture content is as much as 0.5 to 0.1% by weight at room temperature. Therefore, molded articles made from the polyurethane elastomers are liable to foam and their physical properties deteriorate, unless predrying is carried out prior to molding. These disadvantages are also present in thermosetting polyurethane resins. The problem of the hygroscopicity cannot be solved even by using a polyol such as trimethylolpropane which forms three-dimensional crosslinking.

The present inventors have found that the hygroscopicity of the urethane resin can be remarkably lowered by replacing the polyol with a thiol and by forming three-dimensional crosslinking, and that the urethane resin having such a low hygroscopicity can be surface-treated even by the use of a usual silicone coating agent.

Furthermore, in the case that the urethane resin just described is used as a coating material, we have found the following fact: The polymerization rate of the polythiol with a polyisocyanate at ordinary temperatures is lower than that of the polyol therewith, and therefore when the polythiol is used to produce the urethane coating material, the coating material made therefrom can have a prolonged pot life. In addition, it has also been found that, as in the case of a conventional urethane coating material, when three-dimensional crosslinking is formed in the urethane coating material comprising the polythiol, the hygroscopicity of a coating film made therefrom can be lowered.

Moreover, in the case that the above-mentioned urethane resin is used as an adhesive, the following fact has been found: When the polythiol is employed as the compound which reacts with the polyisocyanate, the polymerization rate at ordinary temperatures is lower than when the polyol is used, and therefore the adhesive prepared from the polythiol can have a long pot life. Furthermore, it has been found that an increase in numbers of isocyanate groups in the polyisocyanate and thiol groups in the polythiol compound improves the state of the three-dimensional crosslinking, with the result that the water absorption of the adhesive layer resin made therefrom can be remarkably lowered and water resistance thereof can also be increased significantly.

Furthermore, on the way of the investigating the low-hygroscopic sulfur-containing urethane resin to utilize to the plate, the coating material and the adhesive, it has been found that the three-dimensional crosslinked sulfur-containing urethane resin has an excellent shape-recoverable property. On the basis of these findings, the present invention has been achieved.

The present invention relates to a low-hygroscopic sulfur-containing urethane resin which is prepared by first selecting a polyisocyanate compound having m (which is an integer of 2 or more) isocyanate groups in one molecule and a polythiol compound having n (which is an integer of 2 or more) thiol groups in one molecule so that the total number of m+n may be 5 or more, and then polymerizing the composition containing the polyisocyanate compound and the polythiol compound; a low-hygroscopic sulfur-containing urethane coating material which comprises the above-mentioned composition; and a low-hygroscopic sulfur-containing urethane adhesive which comprises the above-mentioned composition.

The reason why the sulfur-containing urethane resin of present invention is of the low hygroscopicity, though not elucidated perfectly, can be presumed as follows: The thiocarbamate bond

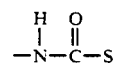

in the urethane resin of the present invention has a less affinity for water than the usual urethane bond

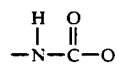

and urethane resin of the present invention has the three-dimensional crosslinking, so that water molecules would be prevented from getting into the resin.

Examples of the polyisocyanates compound having m (which is an integer of 2 or more) isocyanate groups in one molecule used in the present invention include aliphatic and alicyclic polyisocyanates such as hexamethylene diisocyanate, isophorone diisocyanate, 4,4'-dicyclohexylmethane diisocyanate, diisocyanatocyclohexane, bis(isocyanatomethyl)cyclohexane, diisocyanatomethylcyclohexane, bicycloheptane triisocyanate and lysine isocyanate-β-isocyanatoethyl ester; polyisocyanates in which each isocyanate group is directly linked to an aromatic ring, such as tolylene diisocyanate, 4,4'-diphenylmethane diisocyanate, tolidine diisocyanate and triphenylmethane triisocyanate; and polyisocyanates in which each isocyanatomethine group is linked to an aromatic ring, such as xylene diisocyanate, mesitylene triisocyanate and bis(α,α-dimethylisocyanatomethyl)benzene, and adduct compounds of these polyisocyanates and trimethylolpropane, and isocyanate compounds which are trimers of diisocyanates. Of these compounds, the aliphatic or alicyclic polyisocyanates and the polyisocyanates in which each isocyanatomethine group is linked to the aromatic ring are preferable, because they are excellent in weathering resistance and resist yellowing over time.

Examples of polythiol compounds having n (which is an integer of 2 or more) thiol groups in one molecule include bis(2-mercaptoethyl) ether, 1,2-ethanedithiol, 1,4-butanedithiol, bis(2-mercaptoethyl) sulfide, ethylene glycol bis(2-mercapto acetate), ethylene glycol bis(3-mercapto propionate), 2,2-dimethylpropanediolbis(2-mercapto acetate), 2,2-dimethylpropanediolbis(3-mercapto propionate), trimethylolpropanetris(2-mercapto acetate), trimethylolpropanetris(3-mercapto propionate), trimethylolethanetris(2-mercapto acetate), trimethylolethanetris(3-mercapto propionate), pentaerythritoltetrakis(2-mercapto acetate), pentaerythritoltetrakis(3-mercapto propionate), dipentaerythritolhexakis(2-mercapto acetate), dipentaerythritolhexakis(3-mercaptopropionate), 1,2-dimercaptobenzene, 4-methyl-1,2-dimercaptobenzene, 3,6-dichloro-1,2-dimercaptobenzene, 3,4,5,6-tetrachloro-1,2-dimercaptobenzene, xylenedithiol and 1,3,5-tris(3-mercaptopropyl) isocyanurate.

In the resin, coating material and adhesive of the present invention, the polyisocyanate compound having m (which is an integer of 2 or more) isocyanate groups in one molecule and the polythiol compound having n (which is an integer of 2 or more) thiol groups in one molecule are selected so that the total number of m+n may be 5 or more, and they are combined with each other. Further, the polyisocyanate compound and the polythiol compound are used in an NCO/SH functional group molar ratio of 0.5 to 3.0, preferably 0.5 to 1.5.

In the resin of the present invention, a polymerization catalyst such as dibutyltin dilaurate or dimethyltin chloride may be used in an amount of 0.01 to 1.0% by weight in order to accelerate the urethane formation polymerization reaction between the polyisocyanate and the polythiol.

In the case that molded articles such as resin plates, or shape-recoverable molding articles are manufactured from the resin of the present invention, the surface of a mold may be previously treated with wax, silicon or a fluorine-containing external release agent so that the molded articles may be easily released from the mold after cast polymerization. Alternatively, it is also possible to previously add, to the mixture of the polyisocyanate and the polythiol, a silicone- or fluorine-containing nonionic surface active agent, a cationic surface active agent such as an alkyl quaternary ammonium salt, or an anionic surface active agent such as acidic phosphoric ester as an internal release agent. In this case, the amount of the internal release agent to be added is preferably 10 to 5,000 ppm based on the total weight of the mixture.

In addition, in order to improve the weathering resistance of the sulfur-containing urethane resin regarding the present invention, there may be added an additives such as ultraviolet ray absorber, an antioxidant, a coloring inhibitor and a fluorescent dye, if desired.

Thick transparent plates for windowpanes for vehicles, covers having a special shape for lighting units, and shape-recoverable molded article such as toy, apparel article, portable tableware and pipe-joints can be manufactured from the resin of the present invention by the following procedure.

First of all, a polymerization catalyst, an internal release agent and an ultraviolet ray absorber, if desired, are added to the mixture of a polyisocyanate and a polythiol to form a uniform solution, and the latter is then poured into a mold prepared by fastening two glass plates with a clamp from outside between which ethylene-vinyl acetate copolymer or polyvinyl chloride is interposed as a spacer, or into a metallic female mold suitable for this application. Afterward, the mold containing the solution is placed in a thermal polymerization furnace, and thermal polymerization is then performed therein, followed by cooling, thereby obtaining a desired molded article of the sulfur-containing urethane resin. A time period necessary for this cast polymerization is usually 3 to 48 hours at 30° to 120° C., depending upon the specific polyisocyanate and polythiol used and the heating temperature.

In the coating material and the adhesive of the present invention, the rate of the urethane polymerization reaction of the polythiol with the polyisocyanate is much lower than that of a polyol therewith, and the increase in viscosity which occurs in mixing the two liquids is also slight. These tendencies are similarly seen in the case that an amine, an organic metal or quaternary ammonium fluoride which is the polymerization catalyst is added. However, in order to accelerate the thermal cure reaction after coating, it is desirable to add, to the reaction system, an organic tin compound having a low polymerization catalyst function ordinary temperatures and having a strong function at the time of the thermal cure reaction. Examples of such organic tin compound include dibutyltin dilaurate, dibutyltinbis(octylthioglycol ester) and dibutyltinbis(isomercapto acetate), and this tin compound is used in an amount of 0.01 to 1.0% by weight.

In addition, in order to color a coating film formed from the sulfur-containing urethane coating meterial of the present invention, various pigments may be added to the reaction system, and in order to improve the light resistance of the coating film, there may be added thereto additives such as an ultraviolet ray absorber, an antioxidant and a coloring inhibitor, if desired.

With regard to the adhesive of the present invention, in order to prevent an adhesive layer from becoming discolored with time, for example, in windowpanes for automobiles, an ultraviolet ray absorber, an antioxidant and a coloring inhibitor may be added thereto, and in order to color the adhesive layer and to provide the adhesive layer with heat insulation effect, a dye and an infrared ray absorber may be added thereto, if desired.

With regard to the coating material and the adhesive of the present invention, in order to properly maintain the viscosity of the coating material and the adhesive at the time of coating, an organic solvent may be used, but it is preferable with use a solvent which is not reactive to the polyisocyanate and the polythiol, i.e., an ester, a halogenated hydrocarbon or an aromatic hydrocarbon.

Thus, the coating material having low water absorption of the present invention may be prepared by first adding an organic solvent, a pigment, an ultraviolet ray absorber, an antioxidant and a coloring inhibitor to either or both of the polyisocyanate and the polythiol, sufficiently dispersing them therein with a paint shaker, and then mixing a polyisocyanate solution, a polythiol solution and a polymerization catalyst in order to perform polymerization, thereby obtaining the desired coating material. Preferably, the thus obtained urethane coating material is rapidly subjected to subsequent application and curing for the purpose of inhibiting a reaction with moisture in air, but when the moisture in the ambient atmosphere on the coated surface is minimized, the occurrence of cavities in the coating film made therefrom can be prevented. A heating temperature and a heating time necessary for the curing of the coating film are usually 30° to 180° C. and several minutes to several days, respectively, depending upon kinds of polyisocyanate, polythiol and polymerization catalyst which are used.

The sulfur-containing urethane coating material prepared without any polymerization catalyst by the present invention has a much longer pot life than a usual urethane coating material prepared by using a polyol, and the pot life can be arbitrarily determined by selecting the polymerization catalyst. With regard to the sulfur-containing urethane coating film formed by curing the sulfur-containing urethane coating material of the present invention, its hygroscopic coefficient (ISO R62B process which comprises dipping a specimen in distilled water at 23° C. for 24 hours, measuring the weight of the specimen immediately after removal, and calculating the increment) is in the range of 0.02 to 0.30% by weight. Therefore, it is apparent that the hygroscopic coefficient of the sulfur-containing urethane coating film of the present case is considerably lower than that of the usual polyurethane coating film. In consequence, the sulfur-containing urethane coating material of the present invention can be utilized for the outer decoration of buildings, airplanes, railway cars which are exposed to rainwater and the like.

The adhesive having low water absorption and good water resistance of the present invention may be prepared by first adding an organic solvent, an ultraviolet ray absorber, an antioxidant, a coloring inhibitor, a dye and an infrared ray absorber to either or both of the polyisocyanate and the polythiol, sufficiently dissolving or dispersing them therein, and mixing sufficiently suitable amounts of a polyisocyanate solution, a polythiol solution and a polymerization catalyst, in order to perform polymerization, thereby obtaining the desired adhesive liquid.

The thus obtained sulfur-containing urethane adhesive tends to react with moisture in air, and therefore it is preferred that the adhesive is rapidly used or put in a nitrogen gas atmosphere.

A heating temperature and heating time necessary for curing the adhesive liquid are usually 30° to 180° C. and several minutes to several days, respectively, depending upon the specific polyisocyanate, polythiol and polymerization catalyst which are used.

With regard to the sulfur-containing urethane resin of the present invention prepared by cast-polymerizing the polyisocyanate and the polythiol, its hygroscopic coefficient is much lower than the usual polyurethane resin, and its deformation temperature is also increased. Therefore, the low-hygroscopic urethane resin of the present invention is very useful for the glazing of windowpanes for vehicles and covers for lighting units, and for information recording medium substrates such as photodisks and photocards.

Furthermore, the sulfur-containing urethane resin of the present invention have an excellent shape-recoverable property, therefore it is useful for toys, apparel articles, portable tableware, pipe joints, and the like.

As is apparent from examples and comparative examples given below, the resin of the present invention has a low hygroscopicity. That is, the hygroscopic coefficient of the resin regarding the present case is in the range of 0.02 to 0.20% by weight, which is lower than the hygroscopic coefficient of 0.35% by weight or more of other resins referred to in the comparative examples.

Furthermore, molded articles made from the sulfur-containing urethane resin of the present invention have good adhesive properties with a conventional hard coat film treated with a hard coating agent.

The coating material of the present invention has a prolonged pot life and a low hygroscopicity, and is useful in applications in which durability is required.

The sulfur-containing urethane adhesive prepared without any polymerization catalyst by the present invention has a much longer pot life than a usual urethane adhesive prepared by using a polyol, and the pot life can be arbitrarily determined by selecting the polymerization catalyst.

When an adhesive layer is formed by coating either surface of a steel plate with the sulfur-containing urethane adhesive of the present invention and then curing the same, the hygroscopic coefficient (ISO R62B process which comprises dipping a specimen in distilled water at 23° C. for 24 hours, measuring the weight of the specimen immediately after removal, and calculating the increment) of the thus formed adhesive layer is in the range of 0.02 to 0.30% by weight, which is much lower than in the case of a conventional urethane adhesive. Moreover, even after dipping in warm water, the adhesive layer of the present invention can still have an improved adhesive force.

Therefore, the sulfur-containing urethane adhesive of the present invention is very useful as adhesives for structures which are always exposed to rainwater, adhesives in lumber, and adhesives for cloth for which resistance to washing is required.

EXAMPLES

Now, the present invention will be described in detail by way of examples. In the examples, all parts are based on weight.

EXAMPLE 1

Polyvinyl chloride spacers were held between and on peripheries of two glass plates having a thickness of 5 mm, and the glass plates were then fastened firmly with clamps to prepare a mold. Afterward, a mixture of 223 parts (0.1 mol) of isophorone diisocyanate, 244 parts (0.5 mol) of pentaerythritol tetrakis(3-mercapto propionate), 0.5 part (0.0008 mol) of dibutyltin dilaurate and 0.5 part (0.0024 mol) of dioctyl acid phosphate was poured into the thus prepared mold. In a hot-air oven for polymerization, heat polymerization was performed at a temperature of 45° to 110° C. over 24 hours, and the resulting reaction product was then cooled and released from the mold in order to prepare a sulfur-containing urethane resin plate. This plate was again placed in the hot-air oven to heat it at 120° C. for 2 hours, and it was then cooled gradually, whereby optical strain was removed therefrom which had occurred during polymerization. The hygroscopic coefficient (ISO R62B process which comprises dipping a specimen in distilled water at 23° C. for 24 hours, removing the specimen, measuring the weight of the specimen immediately, and calculating the increment) of this plate was 0.11% by weight. Furthermore, the pencil hardness (in accordance with JIS K-5400 process) and the deformation temperature (in accordance with ASTM D648) of this plate were H and 128° C., respectively. The plate was further washed with isopropanol and dipped into a solution of silicone coating agent (trade name X-12-2321A; made by The Shin-Etsu Chemical Co., Ltd.). Afterward, the plate was removed slowly therefrom, and heat curing was then carried out at 110° C. for 3 hours, followed by cooling slowly. The surface of the thus treated plate had a pencil hardness of 6H.

EXAMPLE 2

Polyvinyl chloride spacers were held between and on peripheries of a glass plate having a thickness of 5 mm and a steel plate (SUS 304) having a thickness of 3 mm, and these plates were then fastened firmly with clamps to prepare a mold. Afterward, a mixture of 194 parts (1.0 mol) of 4,4'-dicyclolhexylmethane diisocyanate, 228 parts (0.67 mol) of trimethylolpropanetris(2-mercapto acetate), 0.5 part (0.0008 mol) of dibutyltin dilaurate and 0.5 part of "Unidain DS-401" (made by Daikin Kogyo Co., Ltd.) was poured into the thus prepared mold. In a hot-air oven for polymerization, heat polymerization was performed at a temperature of 45° to 110° C. over 24 hours, and the resulting reaction product was then cooled and released from the mold in order to prepare a clear transparent sulfur-containing urethane resin plate. This plate was again placed in the hot-air oven to heat it at 120° C. for 2 hours, and it was then cooled gradually, whereby optical strain was removed therefrom which had occurred during polymerization. The hygroscopic coefficient of this plate was 0.09% by weight. Furthermore, the pencil hardness and the deformation temperature of this plate were H and 115° C., respectively. The plate was further washed with isopropanol and dipped into a solution of silicone coating agent (trade name X-12-2321A; made by The Shin-Etsu Chemical Co., Ltd.). Afterward, the plate was removed slowly therefrom, and heat curing was then carried out at 110° C. for 3 hours, followed by cooling slowly. The surface of the thus treated plate had a pencil hardness of 5H.

EXAMPLES 3 TO 9

Following the procedure of Example 1, sulfur-containing urethane resin plates were prepared by use of compositions shown in Table 1. Performances of these resin plates are shown in Table 1.

COMPARATIVE EXAMPLES 1 TO 3

Following the procedure of Example 1, sulfur-containing urethane resin plates were prepared by the use of compositions shown in Table 1. Performances of these resin plates are shown in Table 1.

ture. Heating was then carried out at 45° C. for 3 hours, at 60° C. for 2 hours, at 80° C. for 2 hours, and at 120° C. for 1 hour in order to perform curing, followed by cooling, thereby obtaining a molded lens having the curvature. The molded lens was then placed in a hot-air oven at 120° C. and was pressed between two flat glasses, and it was then taken out and cooled to room temperature in order to prepare a flat disk plate without any curvature. The disk plate was again heated up to 100° C., so that the molded lens which had recovered the previous curvature was obtained.

EXAMPLE 11

To a mixture of 47 parts of 1,3-xylylene diisocyanate, 84 parts of an isocyanurate which was the trimer of hexamethylene diisocyanate and 122 parts of pentaerythritoltetrakis(3-mercapto propionate) were added 0.1 part of dibutyltin dilaurate and 0.1 part of dioctyl acid

TABLE 1

| | Polyisocyanate (mol) | Polythiol (mol) |
|---|---|---|
| Ex. 1 | Isophorone diisocyanate (1.0) | Pentaerythritoltetrakis(3-mercapto propionate) (0.5) |
| Ex. 2 | 4,4'-Dicyclohexylmethane diisocyanate (1.0) | Trimethylolpropanetris(2-mercapto acetate) (0.67) |
| Ex. 3 | 1,4-Bis(isocyanatemethyl)-cyclohexane (0.8) Tolylene diisocyanate (0.2) | Dipentaerythritolhexakis(3-mercapto propionate) (0.33) |
| Ex. 4 | 2,4-Diisocyanate-1-methyl-cyclohexane (0.8) Hexamethylene diisocyanate (0.2) | 1,3-Xylylenedithiol (0.50) 1,3,5-Tris(3-mercaptopropyl)iso-cyanurate (0.34) |
| Ex. 5 | Isophorone diisocyanate (1.0) | 2,4,5,6-Tetrachloro-1,3-bis(mercaptomethyl)-benzene (0.50) Pentaerythritoltetrakis(2-mercapto acetate) (0.15) |
| Ex. 6 | Lysineisocyanate-$\beta$-isocyanate ethyl ester (1.0) | 1,3,5-Tris(3-mercaptopropyl)isocyanate (0.67) |
| Ex. 7 | 1,3-Xylylene diisocyanate (0.5) 1,4-Xylylene diisocyanate (0.5) | Pentaerythritoltetrakis(3-mercaptopropionate) (0.5) |
| Ex. 8 | 1,4-Bis($\alpha,\alpha$-dimethyliso-cyanate methyl)benzene (1.0) | Pentaerythritoltetrakis(3-mercaptopropionate) (0.5) |
| Ex. 9 | Isophorone diisocyanate (1.0) | 1,3,5-Tris(3-mercaptopropyl)isocyanurate (0.67) |
| Comp. Ex. 1 | Isophorone diisocyanate (1.0) | 1,3-Xylylene dithiol (1.0) |
| Comp. Ex. 2 | 1,3-Xylylene diisocyanate (0.5) 1,4-Xylylene diisocyanate (0.5) | Etylene glycol(2-mercapto propionate) (1.0) |
| Comp. Ex. 3 | "Parapren 22S" (made by Nippon Elastoran Co., Ltd.; polyester polyurethane) | |

| | Appearance | Refractive index | Specific gravity | Water absorption (%) | Deformation temp. (°C.) | Pencil hardness Before coated | Pencil hardness After coated |
|---|---|---|---|---|---|---|---|
| Ex. 1 | Colorless | 1.57 | 1.31 | 0.11 | 128 | H | 6H |
| Ex. 2 | " | 1.56 | 1.28 | 0.09 | 119 | H | 5H |
| Ex. 3 | " | 1.58 | 1.31 | 0.14 | 112 | H | 5H |
| Ex. 4 | " | 1.59 | 1.30 | 0.10 | 108 | H | 5H |
| Ex. 5 | " | 1.61 | 1.39 | 0.07 | 127 | 2H | 6H |
| Ex. 6 | " | 1.58 | 1.30 | 0.15 | 105 | H | 5H |
| Ex. 7 | " | 1.60 | 1.34 | 0.06 | 108 | H | 6H |
| Ex. 8 | " | 1.57 | 1.33 | 0.08 | 112 | H | 6H |
| Ex. 9 | " | 1.55 | 1.36 | 0.10 | 130 | H | 6H |
| Comp. Ex. 1 | " | 1.59 | 1.28 | 0.35 | 78 | HB | Non-adhesive |
| Comp. Ex. 2 | " | 1.53 | 1.31 | 0.88 | 67 | HB | Melted in coating |
| Comp. Ex. 3 | Opaque | — | 1.21 | 1.23 | Rubbery at ordinary temp. | — | — |

EXAMPLE 10

To a mixture of 188 parts of 1,3-xylylene diisocyanate and 244 parts of pentaerythritoltetrakis(3-mercapto propionate) were added 0.5 part of dibutyltin dilaurate and 0.5 part of dioctyl acid phosphate, and they were then uniformly mixed. Afterward, the mixture was poured into a mold for an eyeglass lens having curvaphosphate, and they were then uniformly mixed. Afterward, the mixture was poured into a mold for an eyeglass lens having curvature. Heating was then carried out at 45° C. for 3 hours, at 60° C. for 2 hours, at 80° C. for 2 hours, and at 120° C. for 1 hour in order to perform curing, followed by cooling, thereby obtaining a molded lens having the curvature. The molded lens was then placed in a hot-air oven at 100° C. and was pressed between two flat glasses, and it was then taken out and cooled to room temperature in order to prepare a flat disk plate without any curvature. The disk plate was again heated up to 70° C., so that the molded lens which had recovered the previous curvature was obtained.

EXAMPLE 12

First, 223 parts of isophorone diisocyanate was mixed with 223 parts of butyl acetate to prepare a coating material component (A). Next, 244 parts of pentaerythritoltetrakis(3-mercapto propionate), 30 parts of titanium white, 0.8 part of an ultraviolet ray absorber (trade name Biosorb 583; made by Kyodo Yakuhin Co., Ltd.) and 100 parts of butyl acetate were sufficiently uniformly mixed by the use of a paint shaker in order to prepare a coating material component (B).

After 2 parts of dibutyltin dilaurate had been added to and dissolved in 446 parts of the coating material component (A), 374 parts of the coating material component (B) was mixed therewith. They could be mixed promptly, and the viscosity of the mixture at ordinary temperature scarcely increased even after 6 hours. The thus obtained coating material was applied onto a steel plate so that the thickness of a dry film might be 50 μm, and it was then dried and cured at a temperature of 130° C. for 1 hour. For the thus obtained coating film, the following tests were carried out to inspect its performance. The results are set forth in Table 2.

POT LIFE TEST

Without using any polymerization catalyst, the coating material components (A) and (B) were placed in a 50-ml Erlenmeyer flask with a ground stopper and were then allowed to stand therein at 25° C. for 1 week. Afterward, the pot life was evaluated, and a sample having fluidity was represented by O and a sample having no fluidity was represented by X.

CURING PROPERTIES

A coating film, which had been heated at 130° C. for 1 hour in accordance with the procedure in the examples and had been removed from a hot-air oven, was immediately inspected. A tack-free coating film was represented by O and a tacky coating film was represented by X.

CHECKERS TEST

The process of JIS K5400 was employed. An acceptable example was represented by O and a rejected example was represented by X.

ERICHSEN TEST

The process of JIS K5400 was employed. An acceptable example was represented by O and a rejected example was represented by X.

WATER ABSORPTION

In accordance with the procedure of the examples with the exception that any titanium white was not used, a clear coating film was formed on a steel plate previously weighed, and the weight of the solid coating film was measured. Afterward, the film was dipped in water (25° C.) for 24 hours, and after water attached on the film was wiped therefrom, the increment of the film was rapidly measured. A ratio (% by weight) of the increment to the weight of the solid coating film was then calculated.

EXAMPLE 13

First, 188 parts of 1,3-xylylene diisocyanate was mixed with 188 parts of xylene to prepare a coating material component (A). Next 244 parts of pentaerythritoltetrakis(3-mercapto propionate), 30 parts of titanium white, 0.8 part of an ultraviolet ray absorber (trade name Biosorb 583; made by Kyodo Yakuhin Co., Ltd.) and 100 parts of xylene were sufficiently uniformly mixed by a paint shaker in order to prepare a coating material component (B).

After 1 part of dibutyltinbis(octyl thioglycolate) had been added to and dissolved in 376 parts of the coating material component (A), 374 parts of the coating material component (B) was mixed therewith. They could be mixed promptly, and the viscosity of the mixture at ordinary temperature scarcely increased even after 6 hours. The thus obtained coating material was then applied onto a steel plate so that the thickness of a dry film might be 50 μm, and it was then dried and cured at a temperature of 130° C. for 1 hour. Performances of the thus obtained coating film are set forth in Table 2.

EXAMPLE 14

First, 155 parts of 1,3-bis(isocyanate methyl)cyclohexane, 35 parts of tolylene diisocyanate and 190 parts of butyl acetate were mixed with one another to prepare a coating material component (A). Next, 261 parts of dipentaerythritolhexakis(3-mercapto propionate), 30 parts of titanium white, 6 parts of carbon black, 0.5 part of an ultraviolet ray absorber (trade name Biosorb 583; made by Kyodo Yakuhin Co., Ltd.) and 100 parts of butyl acetate were sufficiently uniformly mixed by a paint shaker in order to prepare a coating material component (B).

After 0.5 part of dibutyltin dilaurate had been added to and dissolved in 380 parts of the coating material component (A), 397 parts of the coating material component (B) was mixed therewith. They could be mixed promptly, and the viscosity of the mixture at ordinary temperature scarcely increased even after 6 hours. The thus obtained coating material was applied onto a steel plate so that the thickness of a dry film might be 50 μm, and it was then dried and cured at a temperature of 130° C. for 1 hour. Performances of the thus obtained coating film are set forth in Table 2.

EXAMPLE 15

First, 244 parts of 1,3-bis(α,α-dimethyl isocyanate methyl)benzene was mixed with 244 parts of xylene to prepare a coating material component (A). Next, 234 parts of 1,3,5-tris(3-mercaptopropyl)isocyanurate, 30 parts of titanium white, 6 parts of carbon black, 0.8 part of an ultraviolet ray absorber (trade name Biosorb 583; made by Kyodo Yakuhin Co., Ltd.) and 100 parts of xylene were sufficiently uniformly mixed by the use of a paint shaker in order to prepare a coating material component (B).

After 1.5 parts of dibutyltin dilaurate had been added to and dissolved in 488 parts of the coating material component (A), 370 parts of the coating material component (B) was mixed therewith. They could be mixed promptly, and the viscosity of the mixture at ordinary temperature scarcely increased even after 6 hours. The thus obtained coating material was then applied onto a steel plate so that the thickness of a dry film might be 50 μm, and it was then dried and cured at a temperature of 130° C. for 1 hour. Performances of the thus obtained coating film are set forth in Table 2.

COMPARATIVE EXAMPLE 4

First, 188 parts of 1,3-xylylene diisocyanate was mixed with 188 parts of xylene to prepare a coating material component (A). Next, 126 parts of polypropylene glycol (molecular weight=420), 182 parts of polypropylene triol (molecular weight=410), 30 parts of titanium white, 0.8 part of an ultraviolet ray absorber (trade name Biosorb 583; made by Kyodo Yakuhin Co., Ltd.) and 100 parts of xylene were sufficiently uniformly mixed by a paint shaker in order to prepare a coating material component (B).

After 1 part of dibutyltinbis(octyl thioglycolate) had been added to and dissolved in 376 parts of the coating material component (A), 438 parts of the coating material component (B) was mixed therewith. At the time of this mixing, exothermic heat was generated slightly, so that the viscosity of the mixture increased. Thus, the mixture was applied promptly onto a steel plate so that the thickness of a dry film might be 50 μm, and it was then dried and cured at a temperature of 130° C. At this time, however, the formation of bubbles in the coating film occurred, and therefore the quality of the coating film was extremely poor.

COMPARATIVE EXAMPLE 5

First, 188 parts of 1,3-xylylene diisocyanate was mixed with 188 parts of xylene to prepare a coating material component (A). Next 238 parts of ethylene glycol bis(2-mercapto propionate), 30 parts of titanium white. 0.8 part of an ultraviolet ray absorber (trade name Biosorb 583; made by Kyodo Yakuhin Co., Ltd.) and 100 parts of xylene were sufficiently uniformly mixed by a paint shaker in order to prepare a coating material component (B).

After 1 part of dibutyltinbis(octyl thioglycolate) had been added to and dissolved in 376 parts of the coating material component (A), 368 parts of the coating material component (B) was mixed therewith. They could be mixed promptly, and the viscosity of the mixture at ordinary temperature scarcely increased even after 6 hours. The thus obtained coating material was then applied onto a steel plate so that the thickness of a dry film might be 50 μm, and drying and curing were then tried at a temperature of 130° C. for 1 hour. However, curing did not occur, so that the coating material remained in a soft state.

that the steel plate was replaced with an aluminum plate.

ADHESIVE FORCE

An adhesive force was evaluated by measuring a shear force of a pair of two adhered aluminum test pieces at a velocity of 50 mm/minute at 25° C. in a temperature control chamber by the use of an autographic recording device made by Shimadzu Seisakusho Ltd.

ADHESIVE FORCE AFTER WARM WATER TREATMENT

A pair of two adhered aluminum test pieces were dipped in warm water at 60° C. for 1 week. After being removed therefrom, the pair of test pieces are allowed to stand at room temperature for 24 hours, and an adhesive force was then measured in the above-mentioned manner.

EXAMPLE 16

To 22.3 parts of isophorone diisocyanate were added to 24.4 parts of pentaerythritoltetrakis(3-mercapto propionate) and 0.08 part of dibutyltin dilaurate, and they were then uniformly mixed.

They could be mixed promptly, and the viscosity of the mixture at ordinary temperature scarcely increased even after 6 hours. The resulting adhesive liquid was then applied onto an aluminum test piece by the use of a bar coater, and the adhesive was sandwiched with another aluminum test piece. Afterward, it was heated and cured under a contact pressure of 1 kg/cm² at 150° C. for 30 minutes.

In order to prepare a test piece for the measurement of the water absorption of an adhesive layer, the adhesive liquid was applied onto the aluminum test piece so that the thickness of its film might be 50 μm, and the adhesive on the test piece was heated and cured at a temperature of 130° C. for 1 hour.

For two kinds of thus prepared test pieces, the above-mentioned tests were carried out, and the test results are set forth in Table 3.

EXAMPLE 17

A mixture was first prepared by uniformly mixing 18.8 parts of 1,3-xylylene diisocyanate, 24.4 parts of pentaerythritoltetrakis(3-mercapto propionate), 0.04 part of an ultraviolet ray absorber (trade name Biosorb 583; made by Kyodo Yakuhin Co., Ltd.) and 0.05 part

TABLE 2

|  | Pot Life Test | Curing Properties (130° C., 1 h.) | Checkers Test | Erichsen Test | Pencil Hardness | Water Absorption (%) |
| --- | --- | --- | --- | --- | --- | --- |
| Example 12 | ○ | ○ | ○ | ○ | H | 0.23 |
| Example 13 | ○ | ○ | ○ | ○ | H | 0.10 |
| Example 14 | ○ | ○ | ○ | ○ | H | 0.29 |
| Example 15 | ○ | ○ | ○ | ○ | H | 0.08 |
| Comp. Example 4 | X | ○ | ○ | ○ | B | 1.33 |
| Comp. Example 5 | ○ | X | X | X | 2B | 1.72 |

Symbol " ○ " = excellent, and symbol "X" = bad.

Prior to describing examples of adhesives, tests used in the examples will be explained.

The pot life test is the same as in the case of the coating materials. The water absorption test is also the same as in the case of the coating material with the exception of dibutyltin(octyl thioglycolate) with one another. They could be mixed promptly, and the viscosity of the mixture at ordinary temperature scarcely increased even after 6 hours.

By the use of this adhesive liquid, two kinds of test pieces were prepared in the same manner as in Example 16.

The thus prepared test pieces were tested, and the performances thereof are set forth in Table 3.

EXAMPLE 18

A mixture was first prepared by uniformly mixing 15.5 parts of 1,3-bis(isocyanate methyl)cyclohexane, 3.5 parts of tolylene diisocyanate, 20 parts of butyl acetate, 26.1 parts of dipentaerythritoltetrakis(3-mercapto propionate) and 0.04 part of dibutyltin dilaurate with one another. They could be mixed promptly, and the viscosity of the mixture at ordinary temperature scarcely increased even after 6 hours.

By the use of this adhesive liquid, two kinds of test pieces were prepared in the same manner as in Example 16.

The thus prepared test pieces were tested, and the performances thereof are set forth in Table 3.

EXAMPLE 19

A mixture was first prepared by uniformly mixing 24.4 parts of 1,3-bis($\alpha,\alpha$-dimethyl isocyanate methyl)-benzene, 20 parts of xylene, 23.4 parts of 1,3,5-tris(3-mercaptopropyl) isocyanurate and 0.2 part of dibutyltin dilaurate with one another.

They could be mixed promptly, and the viscosity of the mixture at ordinary temperature scarcely increased even after 6 hours.

By the use of this adhesive liquid, two kinds of test pieces were prepared in the same manner as in Example 16.

The thus prepared test pieces were tested, and the performances thereof are set forth in Table 3.

COMPARATIVE EXAMPLE 6

To 18.8 parts of 1,3-xylylene diisocyanate was added a mixture of 12.6 parts of polypropylene glycol (molecular weight=420) and 18.2 parts of polypropylene triol (molecular weight=410), and at this time, heat was generated, though it was slight. In addition, the increase in viscosity was observed. In the end, the polymerization reaction progressed rapidly, so that adhesive operation was impossible. Hence, the results of Comparative Example 6 are not set forth in Table 3.

COMPARATIVE EXAMPLE 7

Thirty parts of "Coronate L" (trade name; made by Takeda Chemical Industries, Ltd.); which was an adduct of trimethylolpropane to tolylene diisocyanate, was uniformly mixed with 9 parts of "Nipporan 3002" (trade name; made by Nippon Polyurethane Industry Co., Ltd.) which was isocyanate-modified saturated polyester having a terminal hydroxyl group.

They could be mixed promptly, but the viscosity of the mixture at ordinary temperature increased after the lapse of 6 hours. By the use of the adhesive liquid before its viscosity has increased, two kinds of test pieces were prepared in the same manner as in Example 16. Performances of the thus prepared adhesives are set forth in Table 3.

COMPARATIVE EXAMPLE 8

A mixture was first prepared by uniformly mixing 18.8 parts of 1,3-xylylene diisocyanate, 23.8 parts of ethylene glycol bis(2-mercapto propionate) and 0.05 part of dibutyltinbis(octyl thioglycolate) with one another. They could be mixed promptly, and the viscosity of the mixture at ordinary temperature scarcely increased even after 6 hours.

By the use of this adhesive liquid, two kinds of test pieces were prepared in the same manner as in Example 16.

The thus prepared test pieces were tested, and the performances thereof are set forth in Table 3.

TABLE 3

| | Pot Life Test | Adhesive Force (kg/cm$^2$) | Adhesive Force after Warm Water Treatment (kg/cm$^2$) | Water Absorption (%) |
|---|---|---|---|---|
| Example 16 | ○ | 89 | 82 | 0.33 |
| Example 17 | ○ | 103 | 98 | 0.13 |
| Example 18 | ○ | 88 | 87 | 0.25 |
| Example 19 | ○ | 95 | 90 | 0.07 |
| Comparative Example 7 | X | 86 | 32 | 1.68 |
| Comparative Example 8 | ○ | 63 | 38 | 1.76 |

Symbol " ○ " = excellent, and symbol "X" = poor.

In Examples 16 to 19 in which the polythiol compounds were used as compounds to react with the polyisocyanate compounds and in which values of m+n are 5 or more, the pot life was long, and the adhesive force, the adhesive force after the warm water treatment and the water absorption were excellent. However, in Comparative Example 7 in which the polyol compound was used, the pot life was short, the adhesive force after the warm water treatment was low, and the water absorption was high, though the test pieces were prepared by the use of the adhesive liquid prior to the increase in viscosity.

Also in Comparative Example 8 where the polythiol compound was used and where the value of m+n is 4, the adhesive force and the adhesive force after the warm water treatment were low, and the water absorption was high, though the pot life was long.

What is claimed is:

1. A method of preparing a shape memory article composed of a low-hygroscopic sulfur-containing urethane resin comprising:
forming a composition containing a polyisocyanate compound having m isocyanate groups in one molecule wherein m is an integer of 2 or more and a polythiol compound having n thiol groups in one molecule wherein n is an integer of 2 or more, said polyisocyanate compound and said polythiol compound being selected so that the total number of m+n is 6 or 7, introducing said composition into a mold, cast polymerizing the composition to form an article having a prescribed shape, deforming the cast-polymerized article by applying an external force while heating to a temperature of at least 70° C., and then cooling the article thus deformed to a temperature lower than 70° C. so as to maintain the deformed shape.

2. The method of claim 1 wherein the composition is cured at 30° to 120° C. for 3 to 48 hours.

3. The method of claim 1 wherein the ratio of said polyisocyanate compound to said polythiol compound is such that the molar ratio of the functional groups NCO and SH is in the range of 0.5 to 3.0.

4. The method of claim 1 wherein 0.01 to 1.0% by weight of an organic tin compound catalyst is added to said composition containing said polyisocyanate compound and said polythiol compound.

5. The method of claim 1 wherein the composition further contains at least one of an ultraviolet ray absorber, an antioxidant, a color inhibitor, and a dye.

6. The method of claim 1 wherein the article has a hygroscopic coefficient of 0.02 to 0.20% by weight.

7. The method of claim 1 wherein the article is a toy, an article of apparel, tableware or a pipe joint.

* * * * *